July 8, 1952   F. LANDAU   2,602,912

CONTROLLING DEVICE FOR WINDERS

Filed Oct. 14, 1948   2 SHEETS—SHEET 1

Inventor
Frans Landau.
By *[signature]*
Attorney.

July 8, 1952  F. LANDAU  2,602,912
CONTROLLING DEVICE FOR WINDERS
Filed Oct. 14, 1948  2 SHEETS—SHEET 2
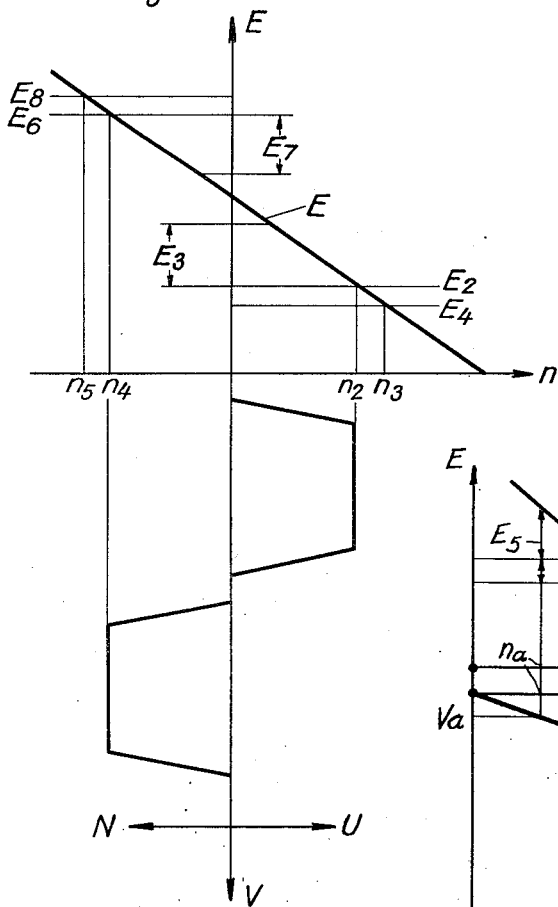
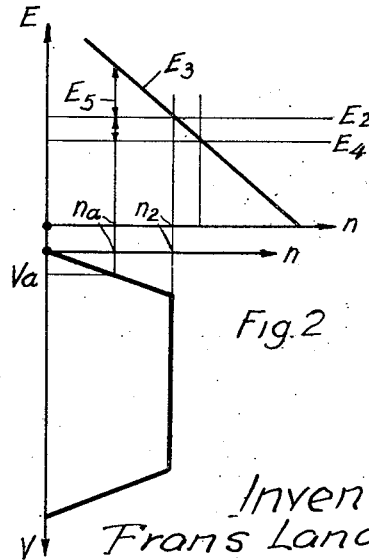
Inventor
Frans Landau.
By
Attorney.

Patented July 8, 1952

2,602,912

UNITED STATES PATENT OFFICE 2,602,912

CONTROLLING DEVICE FOR WINDERS

Frans Landau, Vasteras, Sweden, assignor to Allmanna Svenska Elektriska Aktiebolaget, Vasteras, Sweden, a Swedish corporation Application October 14, 1948, Serial No. 54,500
In Sweden October 10, 1947

7 Claims. (Cl. 318—304)

The present invention relates to an apparatus for winding a material on a reel or for mining hoists and elevators, and particularly to speed limiting means thereof.

In winder operation it is of great importance that the speed of the winder does not exceed a predetermined value, not only during periods of constant speed, but also during periods of acceleration and deceleration. During the latter period the limitation of the speed is particularly important, as the ability to brake the winder in a certain distance depends upon the rate of change in speed. The winding speed is usually limited by mechanical regulators, e. g. the so-called Lilly controller, or by electrical devices with maximum voltage relays fed by a D. C. tachometer generator.

The mechanical regulators are very expensive and bulky, and the electrical devices with maximum-voltage relays are not altogether reliable as the relay does not always function in the intended manner, for instance in the event of interruption in the relay current circuit or when a fault occurs in the tachometer generator.

One object of the present invention is to construct a reliable safety appliance for the operation of said winders.

Another object is to provide electrical means for limiting the speed of said winders to a predetermined value dependent on the position of the cage or car in the shaft or the like.

The present invention differs mainly from previously known electrical devices for the same purpose in that it consists of at least one minimum-voltage relay fed from a three-phase tachometer generator in series with a resistor or rheostat, the resistance of which is controlled dependent on the position of the load cage or car. If the tachometer generator is directly coupled to the winding motor, it is made for a higher synchronous speed than that motor, or otherwise it is coupled to the motor over a reduction gear, in order to obtain under-synchronous speed of the tachometer generator at synchronous speed of the winding motor. The stator of the tachometer generator is preferably connected to the same A. C. network as the winding motor, and its rotor is connected to the minimum-voltage relay in series with the aforementioned resistor or rheostat.

By using a three-phase tachometer generator, connected as described above, a voltage is obtained from its motor across the coil of the minimum voltage relay, which will decrease as the speed of the tachometer generator increases, so that the relay will release when the speed of the winder exceeds a certain value. The fact that the tachometer generator runs widely at under-synchronous speed when the winder runs at normal speed, will ensure that the tachometer generator has a certain rotor voltage, even when the speed of the winder slightly exceeds its normal speed.

In the present arrangement the rotary direction of the tachometer generator must necessarily be the same as that of its rotating stator field in order to achieve a decreasing voltage across the minimum-voltage relay as the speed of the tachometer generator rises. In the opposite direction of rotation, the rotor voltage of the tachometer generator will increase with increasing winder speed and will exceed the rotor voltage at standstill.

In regard to the winder working in both directions, it is therefore possible, according to this invention, either to arrange two similar limiting devices constituted by two minimum-voltage relays as described, one for each direction of rotation, or it is possible to use one limiting device, including one minimum-voltage relay and one maximum voltage relay, both in series with the generator.

For a full and clear understanding of the invention, reference is made to the accompanying drawings, in which two different embodiments of the invention are illustrated.

Figs. 2 and 4 are diagrams showing the functioning of the speed-limiting devices, according to Fig. 1 and Fig. 3 respectively.

Figure 1:
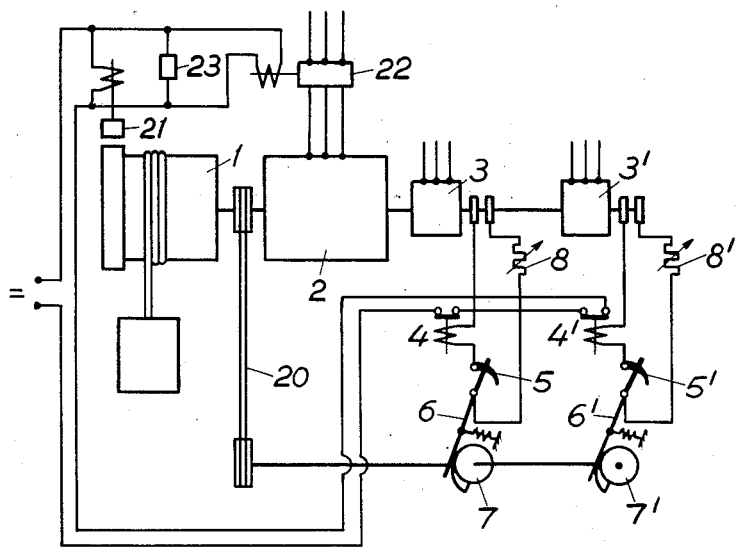
Fig. 1 shows an embodiment including two A. C. tachometer generators and two minimum-voltage relays.

In Fig. 1, the winder is designated 1, the winding motor 2. 3 and 3¹ are two three-phase tachometer generators, coupled to the motor 2, shown by way of example as a three-phase motor, although D. C. motors may be employed. 4 and 4¹ are minimum-voltage relays, each coil of which is connected to the sliprings of the corresponding tachometer generator 3 and 3¹ respectively, in series with resistors or rheostats 5 and 5¹, the ohmic values of which depend on the position of the cage and with adjustable resistors 8 and 8¹. 6 and 6¹ are cam follower contact levers associated with the resistors 5 and 5¹ respectively, and 7 and 7¹ are cams or cam discs, the operation of which is derived from the rotation of the winder 1, and therefore from the position of the cage, by any conventional means symbolized by the reference numeral 20. These cams therefore determine the position of the contact levers 6 and 6¹ on said rheostats.

In Fig. 2, which shows the operating conditions when the winder is rotated in one direction, V denotes the travelling distance of the cage, and $n$ the speed of the winder. $E_3$ is the voltage of the tachometer generator, active in this direction of rotation, and $E_5$ the voltage drop in the resistors 5 and 8. $E_2$ denotes the tachometer generator voltage when winding at normal speed, and $E_4$ is the voltage drop of the minimum-voltage relay 4.

As shown by this diagram, the relay 4 is so adjusted that it only releases at the voltage $E_4$ across the relay, which is lower than the voltage $E_2$ existing between the terminals of the relay on winding condition at normal speed $n_2$. This margin is necessary by reason of the difficulty in maintaining an absolutely constant winding speed.

During acceleration and deceleration periods of the winder when rotating at lower speed than $n_2$, the voltage $E_3$ of the tachometer generator 3 will become larger as the winding speed is reduced, and to be able to use the relay 4 as a speed limiter even at this lower, varying speed, a sufficiently large voltage $E_5$ must be subtracted from the voltage $E_3$ for each value of the rotational speed, to ensure that the voltage relation across the relay 4 is the same as at normal speed. This is attained by varying the ohmic value of the resistor 5 by means of the cam 7. As shown by the diagram, Fig. 2, the same margin is present even in this case, between the normal voltage $E_2$ across the relay 5 and its voltage drop $E_4$.

Connected to the relay contact circuits is the emergency equipment for the winder. This may consist of any conventional arrangement, such as a relay-operated braking device 21 on the winder 1, a relay-operated circuit breaker 22 for disconnecting the motor 2, and a signal device 23.

To enable the described device to be used at different values of the maximum winding speed, an adjustable resistor 8 is suitably interposed in the circuit of the relay 4.

Figure 3:
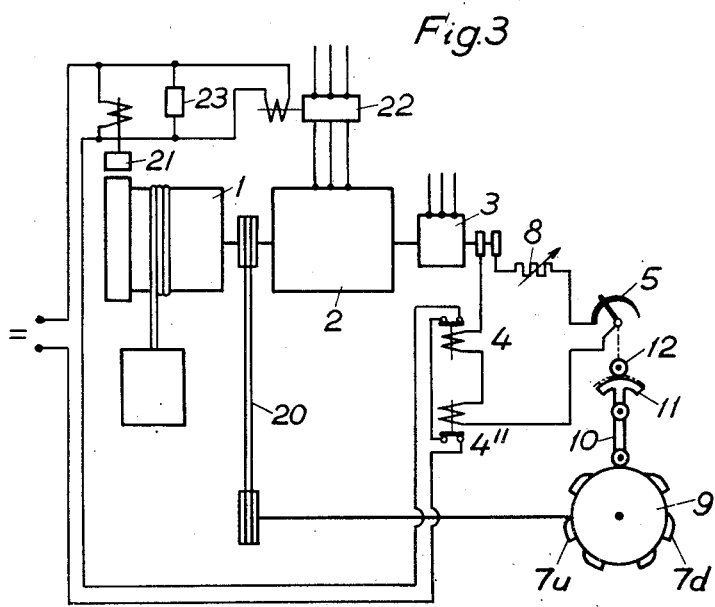
Fig. 3 shows another embodiment of the invention including one A. C. tachometer generator and one minimum-voltage relay and one maximum-voltage relay.

Referring now to Figs. 3 and 4, which disclose a modification of the invention, it will be seen that by providing one minimum-voltage relay and one maximum-voltage relay it is possible to dispense with one of the above-mentioned A. C. tachometer generators.

Owing to the fact that in this embodiment both coils of the relays and the contacts are series-connected in associated circuits, one obtains the same advantage with this arrangement as with the previously described arrangement, namely, that the emergency equipment indicated by 21, 22 and 23 will be operated as soon as any interruption of current occurs in either the primary or secondary circuit of the tachometer generator.

Again, in Fig. 3, 1 denotes the winder, 2 the winding motor, 3 a three-phase asynchronous tachometer generator, 4 a minimum-voltage relay, 4″ is a maximum-voltage relay, 6 and adjustable resistor, and 7 a speed-adjusting resistor or rheostat. 9 denotes a cam disc connected to the winder shaft, as indicated schematically at 20, and geared in such a manner that the cams $7u$ and $7d$ steer the cam follower or arm 10 under the hoisting and lowering operations respectively. The arm 10, when actuated by the cams $7u$ or $7d$, turns a toothed segment 11, which rotates the lever of the rheostat 5 by driving a pinion 12 fixed to the latter.

In Fig. 4 is shown how the voltage of the tachometer generator varies in relation to the winding speed, and direction V again denotes the traveling distance of the cage, and $n$ the speed of the winder. E denotes that amount of voltage of the tachometer generator which is applied across each of the relays. Under hoisting, the rotor of the tachometer generator and the field of the stator will have the same direction of rotation, and thus the voltage of the rotor will decrease with increasing speed. At normal speed $n_2$ the voltage $E_2$ is applied across the minimum-voltage relay 4, but its voltage drop $E_4$ is somewhat lower, owing to difficulties in maintaining constant winding speed at different loads, and it corresponds to a winding speed $n_3$. Under lowering, the rotor of the tachometer generator and the rotating stator field turn in opposite directions, provided that the tachometer generator connection to the network is not reversed. Owing to this, the voltage will increase with increasing speed. At normal lowering speed, the voltage will be $E_6$. In order to ensure the same margin of safety of release action as under hoisting operation, the maximum-voltage relay 4″ will not release until the voltage has increased to $E_8$ and the winding speed to $n_5$.

During the acceleration and deceleration periods, when the winder is running at lower speed than $n_2$ and $n_4$ respectively, the terminal voltage of the tachometer generator 3 will be higher when winding up, but lower when unwinding, than at normal speed.

During the entire acceleration and deceleration period, it is possible to maintain the same margin of release action of the relay 4, because of the movement of the cam follower 10, which, actuated by the cam $7u$, will turn the lever of rheostat 5 and switch in a larger resistance, resulting in a voltage reduction $E_3$ when winding up.

Conditions are the reverse when lowering, and the voltage drop in the rheostat 5 will be reduced by the amount $E_7$.

The current circuit for the contacts of the relays 4 and 4″ again can be employed for operating the emergency brake equipment 21, 22 and 23. By providing several minimum and maximum relays with their coils connected in series, arranged for release at different voltages, various combinations for operating this equipment can be obtained.

If the tachometer generator is so connected that its phase-sequence is reversed simultaneously with that of the winding or hoist motor, the maximum-voltage relay 4 may be omitted if the contacts of the relay 4 are shunted when the voltage of the winding motor is disconnected.

I claim as my invention:

1. Means for preventing winders from being operated at speeds exceeding certain predetermined values dependent on the position of the load to be moved, comprising at least one alternating current tachometer generator means having a synchronous speed which is higher than the maximum winder speed, said generator means being coupled with the driving motor for the winder, two relays having their coils connected with terminals of the rotor circuit of said tachometer generator means, contacts on said relays series connected in an operating circuit, voltage regulating means series connected with said relay coils, cam means actuated in dependence upon the position of the load for controlling the said voltage regulating means, and a control device for the winder operable from said circuit in which the relay contacts of said relays are series-connected.

2. Means for preventing winders from being operated at speeds exceeding certain predetermined values dependent on the position of the load to be moved, comprising two alternating current tachometer generators having a synchronous speed higher than the maximum speed of the winder, said generators being coupled with the driving motor for the winder, rheostats, two minimum-voltage relays having their coils each connected to the terminals of the rotor circuit of one of the tachometer generators through one of said rheostats, cams geared with the shaft of the winder and operatively connected with said rheostats whereby the regulation of said rheostat is derived from the position of the load, an operating circuit including the contacts of said relays in series connecton, and a control device for the winder operable from said circuit.

3. Means for preventing winders from being operated at speeds exceeding certain predetermined values dependent on the position of the load to be moved, comprising one alternating current tachometer generator having a synchronous speed higher than the maximum speed of the winder, said generators being coupled with the driving motor, a rheostat, one minimum-voltage relay and one maximum-voltage relay having their coils series-connected and connected to the terminals of the rotor circuit of said tachometer generator through said rheostat, a cam disc geared with the shaft of the winder and operatively connected with the rheostat whereby the regulation of the rheostat is derived from the position of the load, an operating circuit including in series connection the contacts of said relays, and a control device for the winder operable from said circuit.

4. Means according to claim 2, wherein the tachometer generator consists of a slipringed, three-phase asynchronous machine.

5. Means according to claim 3, wherein the tachometer generator consists of a slipringed, three-phase asynchronous machine.

6. Means according to claim 2, wherein the circuit connected to the terminals of each tachometer generator contains an adjustable resistor for varying the range of speed limitation with respect of different values of the winder speed.

7. Means according to claim 3, wherein the circuit connected to the terminals of each tachometer generator contains an adjustable resistor for varying the range of speed limitation with respect of different values of the winder speed.

FRANS LANDAU.

REFERENCES CITED

The following references are of record in the file of this patent:

UNITED STATES PATENTS

| Number | Name | Date |
|---|---|---|
| 1,138,647 | Eckmann et al. | May 11, 1915 |
| 2,125,140 | Wright | July 26, 1938 |